(12) United States Patent
Pandharipande et al.

(10) Patent No.: US 10,021,767 B2
(45) Date of Patent: Jul. 10, 2018

(54) ZONE BASED LIGHTING ACCESS

(71) Applicant: PHILIPS LIGHTING HOLDING B.V., Eindhoven (NL)

(72) Inventors: Ashish Vijay Pandharipande, Eindhoven (NL); Armand Michel Marie Lelkens, Heerlen (NL); Xiangyu Wang, Eindhoven (NL); Hongming Yang, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/306,594

(22) PCT Filed: Apr. 27, 2015

(86) PCT No.: PCT/EP2015/059056
§ 371 (c)(1),
(2) Date: Oct. 25, 2016

(87) PCT Pub. No.: WO2015/162295
PCT Pub. Date: Oct. 29, 2015

(65) Prior Publication Data
US 2017/0055334 A1   Feb. 23, 2017

(30) Foreign Application Priority Data
Apr. 25, 2014   (EP) .................................. 14165925

(51) Int. Cl.
*H05B 37/02*   (2006.01)
*H04W 4/04*   (2009.01)

(52) U.S. Cl.
CPC .......... *H05B 37/0272* (2013.01); *H04W 4/04* (2013.01)

(58) Field of Classification Search
CPC ......... H04W 4/02; H04W 4/008; H04W 4/04; H04W 4/023; H04W 4/021; H04W 4/026;
(Continued)

(56) References Cited

U.S. PATENT DOCUMENTS 7,852,205 B2   12/2010   Huseth et al.
7,966,021 B2   6/2011   Dietrich et al.
(Continued)

FOREIGN PATENT DOCUMENTS

JP   2007127348 A   5/2007
WO   2009034720 A1   3/2009
(Continued)

OTHER PUBLICATIONS

Author: Wang, Title:Method of Performing Automatic Commissioning of a Network, Date: Apr. 12, 2012.*
(Continued)

*Primary Examiner* — Douglas W Owens
*Assistant Examiner* — Wei Chan
(74) *Attorney, Agent, or Firm* — Meenakshy Chakravorty

(57) ABSTRACT

A system comprising a localization database mapping reference nodes to zones; and a localization module configured to determine a representative measurement based on a combination of measurements for the nodes of each zone (e.g. RSSIs), and to compare the representative measurements with one another in order to directly determine which one or more of the zones the mobile device belongs to. The system further comprises a lighting database mapping between lamps and zones, configured to receive an index of each of the one or more determined zones from the localization module, and based thereon to directly relate the one or more determined zones to one or more of the lamps in the lighting database; and a lighting access service configured to grant the mobile device with access to control of those lamps (Continued)

on condition of being related to the one or more determined zones by the lighting database.

20 Claims, 2 Drawing Sheets

(58) Field of Classification Search
CPC .............. H04W 4/005; H05B 37/0272; H05B 33/0845; H05B 37/0227; H05B 33/0854; H05B 37/0245; H05B 37/0281; H05B 33/0815; H05B 33/0872; H05B 37/0263; H05B 37/0218
USPC ....... 315/307, 224, 294, 944; 340/944, 5.21, 340/6.1, 905
See application file for complete search history.

(56) References Cited

U.S. PATENT DOCUMENTS

| | | | |
|---|---|---|---|
| 2009/0219145 A1 | 9/2009 | Wong et al. | |
| 2011/0025469 A1* | 2/2011 | Erdmann | H04L 12/2809 340/10.1 |
| 2012/0184299 A1* | 7/2012 | Loveland | G05B 15/02 455/456.3 |
| 2014/0015415 A1* | 1/2014 | Lim | H05B 37/02 315/131 |
| 2014/0106735 A1 | 4/2014 | Jackson et al. | |
| 2014/0222213 A1* | 8/2014 | Mohan | G05B 15/02 700/275 |
| 2015/0063495 A1* | 3/2015 | Qu | H04L 27/22 375/330 |

FOREIGN PATENT DOCUMENTS

| | | |
|---|---|---|
| WO | 2012168859 A2 | 12/2012 |
| WO | 2012168859 A2 | 6/2014 |
| WO | 2015025235 A1 | 2/2015 |
| WO | 2015104224 A1 | 7/2015 |
| WO | 2015114123 A1 | 8/2015 |

OTHER PUBLICATIONS

Author: Lelkens, Title:Automatically Commissioning of Devices of a Networked Control System, Date: Dec. 13, 2012.*
Caicedo, D., et al., "Occupancy-Based Illumination Control of LED Lighting Systems," Lighting Res. Technol. 2011 (18 Pages).

* cited by examiner

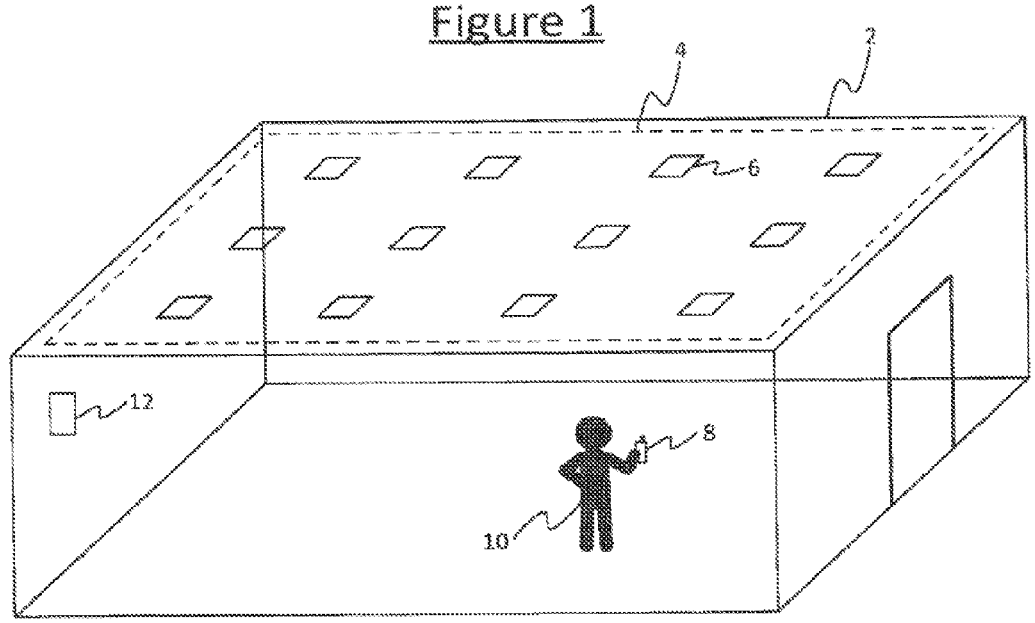
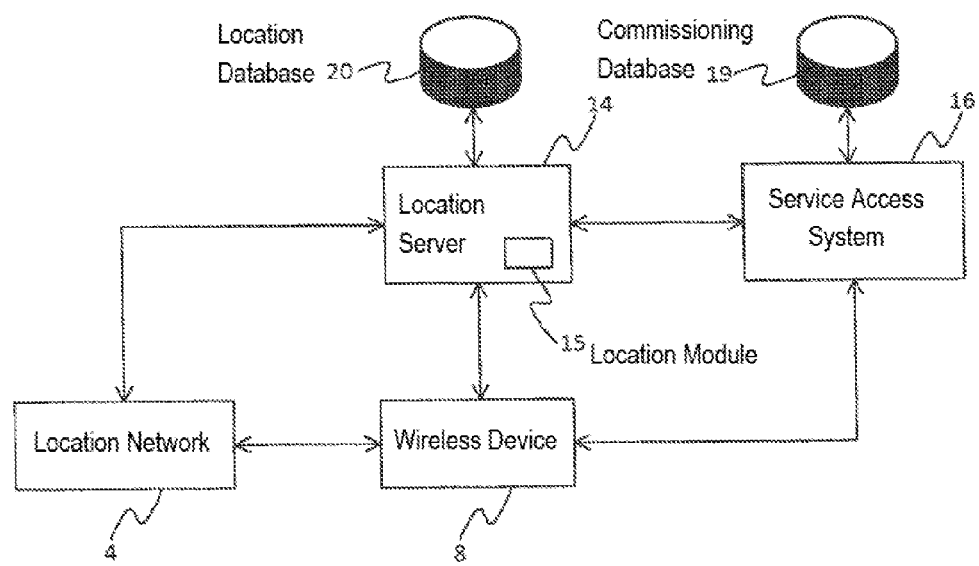

ZONE BASED LIGHTING ACCESS

CROSS-REFERENCE TO PRIOR APPLICATIONS

This application is the U.S. National Phase application under 35 U.S.C. § 371 of International Application No. PCT/EP2015/059056, filed on Apr. 27, 2015, which claims the benefit of European Patent Application No. 14165925.0, filed on Apr. 25, 2014. These applications are hereby incorporated by reference herein.

TECHNICAL FIELD

The present disclosure concerns a service allowing a mobile device to control lighting, and granting the mobile device with access to this service in dependence on a location of the mobile device.

BACKGROUND

In an indoor positioning system, the location of a wireless device such as a mobile user terminal can be determined with respect to a location network comprising multiple wireless reference nodes whose locations are known, typically being recorded in a location database which can be queried to look up the location of a node. These wireless nodes may be referred to as anchor nodes. Measurements are taken of the signals transmitted between the mobile device and a plurality of anchor nodes (typically RF signals), for instance the RSSI (receiver signal strength indicator), ToA (time of arrival) and/or AoA (angle of arrival) of the respective signal. Given such a measurement from three or more nodes, the location of the mobile terminal may then be determined relative to the location network using techniques such as trilateration, multilateration, triangulation, and/or a fingerprint based technique (comparing the current measurements to a "fingerprint" of previously sampled measurements taken at known locations throughout the environment). Given the relative location of the mobile terminal and the known locations of the anchor nodes, this in turn allows the location of the mobile device to be determined in more absolute terms, e.g. relative to the globe or a map or floorplan.

As well as indoor positioning, other types of positioning system are also known, such as GPS or other satellite-based positioning systems in which a network of satellites act as the reference nodes. Given signal measurements from a plurality of satellites and knowledge of those satellites' positions, the location of the mobile device may be determined based on similar principles.

US20140106735 discloses methods and systems in which a portable electronic device communicates with an external device to determine a location. Upon determining its location, the portable electronic device transmits this information as well as identifying information to a control processor. The control processor controls one or more controllable devices according to the location and identifying information. The portable electronic device may determine the location via NFC tag or via one or more RF beacons transmitting information according to the Bluetooth 4.0 protocol.

The determination of the device's location may be performed according to a "device-centric" approach or a "network-centric" approach. According to a device centric approach, each reference node emits a respective signal which may be referred to as a beacon or beaconing signal. The mobile device takes measurements of signals it receives from the anchor nodes, obtains the locations of those nodes from the location server, and performs the calculation to determine its own location at the mobile device itself. According to a network-centric approach on the other hand, the anchor nodes are used to take measurements of signals received from the mobile device, and an element of the network such as the location server performs the calculation to determine the mobile device's location. Hybrid or "assisted" approaches are also possible, e.g. where the mobile device takes the raw measurements but forwards them to the location server to calculate its location.

Based on information about user position in an indoor environment, a variety of location-based services may be offered. One application of a positioning system is to automatically provide a wireless mobile device with access to control of a utility such as a lighting system, on condition that the mobile device is found to be located in a particular spatial region or zone associated with the lighting or other utility. For instance, access to control of the lighting in a room may be provided to a wireless user device on condition that the device is found to be located within that room and requests access. Once a wireless user device has been located and determined to be within a valid region, control access is provided to that device via a lighting control network.

There is a trend toward greater connectivity and intelligence in lighting systems. Thus, wirelessly-networked lighting systems will play an important role with a desire for easier commissioning and control of lighting systems. A consequence will be a dense deployment of anchor nodes, e.g. one wireless node per lamp or a wireless node for a group of lamps in a room.

SUMMARY

In a conventional positioning-based system for service access, the position of the mobile device is computed by the location network in terms of coordinates, based on knowledge of positions of the anchor nodes in terms of their coordinates. In this case, the positions of the anchor nodes have to be known with reasonable accuracy, e.g. to the order of tens of centimeters. The location network then signals the computed position coordinates to a map database which may be referred to as the commissioning database. Control access may be provided in two ways. In one way, access to control lamps that lie within a certain radius of the computed position may be provided. In this case, the coordinates of the lamps need to be known in the commissioning database with reasonable accuracy, e.g. to the order of tens of centimeters. Alternatively, the device's position is translated into a zone and then the mobile device is provided with access to a set of lamps corresponding to that zone. Even in this case, the physical boundaries of the zones need to be known clearly with reasonable accuracy, and the position of the mobile device in terms of its coordinates has to be compared with the defined boundaries of the zone.

It would be desirable to provide a system that did not require this degree of accuracy, e.g. to allow for simpler integration with existing commissioning processes for lighting networks, and/or to reduce complexity given the increasing density of reference nodes such as in the case of one per lamp.

According to one aspect disclosed herein, there is provided system comprising: an input arranged to receive measurements of wireless signals transmitted between a mobile device and a plurality of reference nodes, a localization database arranged to map the reference nodes to zones, and a localization module. In embodiments, the reference nodes may be referred to as anchor nodes at least in that there is some available knowledge regarding their locations, though not necessarily their locations in terms of coordinates. E.g. they may be the anchor nodes of a dedicated indoor positioning system. The measurements may be of signals transmitted from the mobile device to the nodes (network centric) or from the nodes to the mobile device (device centric). In embodiments, the localization module is implemented on a location server.

The localization module is arranged, for each of a plurality of the zones in the localization database, to determine a representative value based on a combination of said measurements for the reference nodes of the respective zone (e.g. average received signal strength). The localization module then compares the representative values of the zones with one another in order to directly determine which one or more of the zones the mobile device belongs to (e.g. based on which has the highest average signal strength). Here directly determine, means without computing coordinates of the mobile device nor referring to boundaries of the zones as an intermediate step. That is, without assessing the coordinates of the mobile device relative to the boundaries of the zone.

The system further comprises a lighting database arranged to map between lamps and said zones. The lighting database is arranged to receive an index or indices of each of the one or more determined zones, transmitted to it from the localization module (e.g. from the location server). Based on the received index or indices, it then directly relates the one or more determined zones to one or more of the lamps in the lighting database. Here directly determine, means without referring to coordinates of the lamps nor boundaries of the zones as an intermediate step. That is, without assessing the coordinates of the lamps relative to the boundaries of the zones.

A lighting access service module is arranged to then receive an indication of the one or more lamps from the database, and grant the mobile device with access to control of these one or more lamps on condition of being related to the one or more determined zones by the lighting database.

An advantage of the disclosed zoning-based service access system compared with conventional position-based access systems is that the former only requires coarse positioning information (e.g. a few meters) while the latter requires fine-grained and accurate physical specification of locations and maps (e.g. to the order of tens of centimeters). For example, the disclosed system and method can thus work with conventionally commissioned lighting systems where the light commissioning database contains a mapping of which lamps belong to which lighting zones (but not necessarily the accurate positions of lamps).

In embodiments, the lighting database may map between sets of lamps and said zones, is arranged to directly relate the one or more determined zones to one or more sets of lamps by means of the lighting database.

The lighting database may provide a one-to-one mapping between said zones and sets of lamps, mapping each zone to a respective set of lamps, and is arranged to directly relate each of the one or more determined zones to its respective set of lamps.

Alternatively the lighting database need not be restricted to a one-to-one mapping between said zones and sets of lamps, is arranged to directly relate each of the one or more determined zones to a respective one or more of the sets of lamps.

In embodiments, said representative value is an average of the measurements for the nodes of the respective zone (e.g. the mean of the measurements). Said measurements may comprise measurements of received signal strength of said wireless signals, or another property related to distance such as time-of-flight.

In further embodiments, the localization module is arranged to perform a hard detection whereby the mobile device is determined to belong to the zone having highest average signal strength measurement, or lowest average time-of-flight.

Alternatively the location module may be arranged to perform a soft detection based on a log likelihood ratio of the probability that the mobile device belongs to a candidate one of said zones n relative to the probability that the mobile device does not belong to the candidate zone n.

In yet further embodiments, the localization module may be arranged to determine said one or more zones additionally based on a likelihood of continuity as the mobile device moves between zones over time.

According to another aspect disclosed herein, there is provided a method comprising: receiving measurements of wireless signals transmitted between a mobile device and a plurality of reference nodes; referring to a localization database which maps the reference nodes to zones; for each of a plurality of the zones in the localization database, determining a representative value based on a combination of said measurements for the reference nodes of the respective zone; comparing the representative values of the zones with one another in order to directly determine which one or more of the zones the mobile device belongs to; transmitting the index or indices of each of the one or more determined zones to a lighting database which, based on the received index or indices, directly relates the one or more determined zones to one or more of the lamps by means of the lighting database; and granting the mobile device with access to control of said one or more lamps on condition of being related to the one or more determined zones by the lighting database.

According to another aspect disclosed herein, there is provided a corresponding computer-program product configured so as when executed on a location server to perform operations of the localization module.

BRIEF DESCRIPTION OF THE DRAWINGS

To assist the understanding of the present disclosure and to show how embodiments may be put into effect, reference is made by way of example to the accompanying drawings in which:

FIG. 1 is a schematic representation of an environment comprising an indoor positioning system;

FIG. 2 is a schematic block diagram of a system for allowing control of lighting in dependence on location;

DETAILED DESCRIPTION OF EMBODIMENTS

Figure 3:
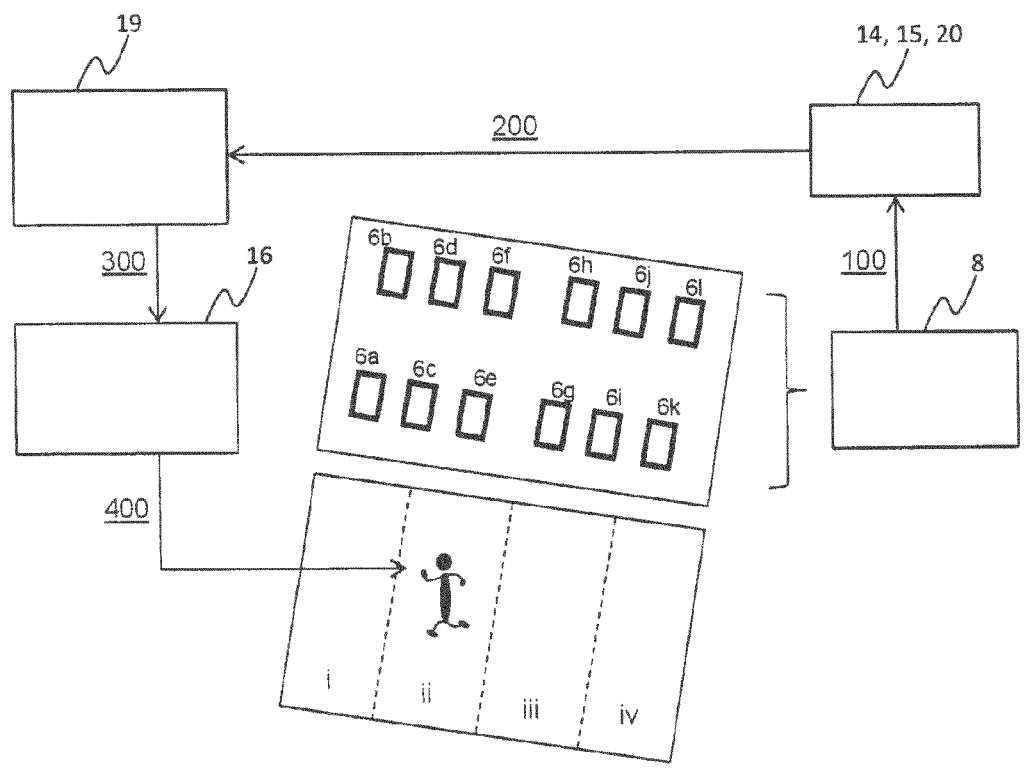
FIG. 3 is a schematic diagram of a system for providing zone-based access to the control of lighting.

The following provides a system for zoning-based positioning, and describes the signaling interactions between various system blocks for service access.

FIG. 1 illustrates an example of a positioning system installed in an environment 2 according to embodiments of the present disclosure. The environment 2 may comprise an indoor space comprising one or more rooms, corridors or halls, e.g. of a home, office, shop floor, mall, restaurant, bar, warehouse, airport, station or the like; or an outdoor space such as a garden, park, street, or stadium; or a covered space such as a gazebo, pagoda or marquee; or any other type of enclosed, open or partially enclosed space such as the interior of a vehicle. By way of illustration, in the example of FIG. 1 the environment 2 in question comprises an interior space of a building.

The positioning system comprises a location network 4, comprising multiple reference nodes in the form of anchor nodes 6 each installed at a different respective fixed location within the environment 2 where the positing system is to operate. For the sake of illustration FIG. 1 only shows the anchor nodes 6 within a given room, but it will be appreciated that the network 4 may for example extend further throughout a building or complex, or across multiple buildings or complexes. In embodiments the positioning system is an indoor positioning system comprising at least some anchor nodes 6 situated indoors (within one or more buildings), and in embodiments this may be a purely indoor positioning system in which the anchor nodes 6 are only situated indoors. Though in other embodiments it is not excluded that the network 4 extends indoors and/or outdoors, e.g. also including anchor nodes 6 situated across an outdoor space such as a campus, street or plaza covering the spaces between buildings.

In yet further embodiments the reference nodes 6 need not necessarily be installed at fixed locations or be dedicated anchor nodes of an indoor positioning system, as long as their locations can still be known. For example the reference nodes could instead be access points 12 of a WLAN or base stations of a cellular purpose used for a secondary purpose of positioning, or could be other mobile devices that have already been located. The following will be described in terms of the reference nodes 6 being anchor nodes of an indoor positioning system or the like, but it will be appreciated this is not necessarily the case in all possible embodiments. Also, while the disclosure is described in terms of wireless radios, the disclosed techniques may be applied to other modalities such as visible light, ultrasound or other acoustic waves, etc.

The environment 2 is occupied by a user 10 having a wireless device 8 disposed about his or her person (e.g. carried or in a bag or pocket). The wireless device 8 takes the form of a mobile user terminal such as a smart phone or other mobile phone, a tablet, or a laptop computer. At a given time, the mobile device 8 has a current physical location which may be determined using the location network 4. In embodiments, it may be assumed that the location of the mobile device 8 is substantially the same as the location of the user 10, and in determining the location of the device 8 it may in fact be the location of the user 10 that is of interest. Another example would be a mobile tracking device disposed about a being or object to be tracked, e.g. attached to the object or placed within it. Examples would be a car or other vehicle, or a packing crate, box or other container. The following will be described in terms of a mobile user device but it will be understood this is not necessarily limiting in all embodiments and most generally the device 8 may be any wireless device having the potential to be found at different locations or an as-yet unknown location to be determined. Further, the location of the mobile device 8 may be referred to interchangeably with the location of the associated user 12, being or object about which it is disposed.

Referring to FIGS. 1 and 2, the environment 2 also comprises at least one wireless access point or router 12 enabling communication with a location server 14 (comprising one or more server units at one or more sites). The one or more wireless access points 12 are placed such that each of the anchor nodes 6 is within wireless communication range of at least one such access point 12. The following will be described in terms of one access point 12, but it will be appreciated that in embodiments the same function may be implemented using one or more access points 12 and/or wireless routers distributed throughout the environment 2. The wireless access point 12 is coupled to the location server 14, whether via a local connection such as via a local wired or wireless network, or via a wide area network or internetwork such as the Internet. The wireless access point 12 is configured to operate according to a short-range radio access technology such as Wi-Fi or ZigBee or Bluetooth, using which each of the anchor nodes 6 is able to wirelessly communicate via the access point 12 and therefore with the location server 14. Alternatively it is not excluded that the anchor nodes 6 could be provided with a wired connection with the location server 14, but the following will be described in terms of a wireless connection via an access point 12 or the like.

The mobile device 8 is also able to communicate via the wireless access point 12 using the relevant radio access technology, e.g. Wi-Fi or ZigBee or Bluetooth, and thereby to communicate with the location server 14. Alternatively or additionally, the mobile device 8 may be configured to communicate with the location server 14 via other means such as a wireless cellular network such as a network operating in accordance with one or more 3GPP standards. Furthermore, the mobile device 8 is able to communicate wirelessly with any of the anchor nodes 6 that happen to be in range. In embodiments this communication may be implemented via the same radio access technology as used to communicate with the access point 12, e.g. Wi-Fi or ZigBee or Bluetooth, though that is not necessarily the case in all possible embodiments, e.g. the anchor nodes 6 may alternatively broadcast to the mobile device 8 on some dedicated localization radio technology.

Generally any of the communications described in the following may be implemented using any of the above options or others for communicating between the respective entities 6, 8, 12, 14 and for conciseness the various possibilities will not necessarily be repeated each time.

The signals between the anchor nodes 6 and the mobile device 8 are the signals whose measurements are used to determine the location of the mobile device 8. In a device centric approach the anchor nodes 6 each broadcast a signal and the mobile device 8 listens, detecting one or more of those that are currently found in range and taking a respective signal measurement of each. Each anchor node 6 may be configured to broadcast its signal repeatedly, e.g. periodically (at regular intervals). The respective measurement taken of the respective signal from each detected anchor node 6 may for example comprise a measurement of signal strength (e.g. RSSI), time of flight (ToF), angle of arrival (AoA), and/or any other property that varies with distance or location.

In a network centric approach, the mobile device 8 broadcasts a signal and the anchor nodes 6 listen, detecting an instance of the signal at one or more of those nodes 6 that are currently in range. In this case the mobile device 8 may broadcast its signal repeatedly, e.g. periodically (at regular intervals). The respective measurement taken of each instance of the signal from the mobile device 8 may comprise a measure of signal strength (e.g. RSSI) or time of flight (ToF), angle of arrival (AoA), and/or any other property that varies with distance or location. In one example of a hybrid approach, the nodes 6 may take the measurements but then send them to the mobile device 8.

There are various options for the manner in which such measurements are started and conducted. For example, either the mobile device may initiate the transmission upon which the measurement is based, or the network may initiate the transmission. Both are possible, but it may have some impact how the rest of the process is implemented, in particular for time-of-flight measurements.

Time-of-flight measurements can be obtained by establishing either a one way transmission delay or a two-way transmission delay (round trip time, RTT). A measurement of one-way delay can suffice if all relevant elements in the network have a synchronized clock or can reference a common clock. In this case the mobile device 8 may initiate the measurement with a single message transmission, adding a timestamp (time or time+date) of transmission to the message (and preferably a message hash over the message content to prevent a malicious party performing replay attack or providing fake message time, e.g. in order to gain unauthorized access). If on the other hand the measurement is not based on a synchronized or common clock, the anchor or reference nodes 6 can still perform a measurement by bouncing individual messages back from the mobile device 8 and determining the round-trip time-of-flight. The latter may involve coordination from the nodes attempting to measure.

In the case of signal strength measurements, there are also different options for implementing these. The determination of distance from signal strength is based on the diminishment of the signal strength over space between source and destination, in this case between the mobile device 8 and anchor or reference node 6. This may for example be based on a comparison of the received signal strength with a-prior knowledge of the transmitted signal strength (i.e. if the nodes 6 or mobile device 8 are known or assumed to always transmit with a given strength), or with an indication of the transmitted signal strength embedded in the signal itself, or with the transmitted signal strength being communicated to the node 6 or device 8 taking the measurement node 6 via another channel (e.g. via location server 14).

Any one or a combination of these approaches or others may be applied in conjunction with the system disclosed herein. Whatever approach is chosen, once such a signal measurement is available from or at each of a plurality of the anchor nodes 6, it is then possible to make a determination as to the location of the mobile device 8 relative to the location network 4.

In a network centric approach, the anchor nodes 6 take measurements of signals received from the mobile device 8, and forward these to the locations server. The location server 14 comprises a location module 15 configured to use these measurements to determine an approximate location of the mobile device 15, as will be discussed in more detail shortly. Alternatively in a device centric approach the mobile device 8 takes measurements of signals received from the anchor nodes 6 and the location module 15 is implemented on the mobile device 8. Assisted approaches are also possible, e.g. whereby the mobile device 8 takes the measurements but forwards them to the location module 15 on the location server 14, or conversely the nodes take measurements but forward them to a location module 15 on the mobile device 8. Note that FIG. 2 shows arrows in all directions to illustrate the possibility of the different device centric, network centric and assisted approaches, but in any given implementation not all the communications shown need be bidirectional or indeed present at all.

Whatever approached is used, this location may then be used to assess whether the mobile device 8 is granted access to a location-based service. To this end, there is provided a service access system 16 configured to conditionally grant access to the service in dependence on the location of the mobile device 8. In a network centric approach, the location server 14 submits the determined location of the mobile device 8 to the service access system 16, e.g. via a connection over a local wired or wireless network and/or over a wide area network or internetwork such as the Internet. The service access system 16 then assesses this location and grants the mobile device 8 with access to the service in the relevant region on condition that the location is consistent with provision of the service (and any other access rules that happens to be implemented, e.g. also verifying the identity of the user 10). In a device centric approach the mobile device submits its determined location to the service access system 16 over a connection via the wireless access point 12 or other means such as a cellular connection. Alternatively the location server 14 may send the location to the mobile device 8, and the mobile device may then forward it on to the service access system 16.

The service access system 16 is configured to control access to a lighting network installed or otherwise disposed in the environment 2. The environment 2 comprises a plurality of lamps and a lighting control system comprising the access system 16. Note that lamp here may refer to any luminaire such as an LED-based lamp or gas discharge lamp, and is not limited to a conventional filament bulb (though that is also certainly an option). The lamps may for example be installed in the ceiling and/or walls, and/or may comprise one or more free standing units.

Figure 4:
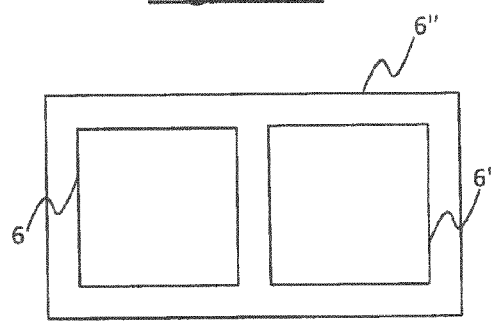
FIG. 4 is a schematic block diagram of an anchor node integrated with a lamp.

Referring to FIG. 4, in embodiments each anchor node 6 is integrated into the same unit or fixture 6" as a respective one of the lamps 6', or otherwise substantially co-located, with one anchor node 6 per lamp, such that each of the units labeled 6 in FIG. 1 in fact corresponds to an anchor node 6 integrated or co-located with a respective lamp 6'. However, note that this is not necessarily the case in all embodiments, and other arrangements could be used with distinct anchor nodes and lamps, and not necessarily in the same numbers as one another.

The lamps 6' are arranged to receive lighting control commands originating from the mobile device 8. In embodiments this may be achieved via the wireless access point 12 using the same radio access technology that the anchor nodes 6 and/or mobile device 8 use to communicate with the wireless access point 12, and/or the same radio access technology used to communicate the signals between the mobile device 8 and anchor nodes 6 in order to take the location measurements, e.g. Wi-Fi or ZigBee or Bluetooth. Alternatively the mobile device 8 may communicate with the lamps 6' by other means, e.g. a separate wired or wireless network. Either way, the access system 16 of the lighting controller is configured with one or more location dependent control policies, to control whether the mobile device 8 is allowed to control the lamps 6' and if so which lamps. For example, a control policy may define that a user 10 can only use his or her mobile device 8 to control the lights in certain zone (such as a room or region within a room) only when found within that zone or within a certain defined nearby zone. In embodiments the mobile device 8 may transmit its commands via the service access system 16 which forwards them to the relevant lamps 6' only if access is granted to those lamps. Alternatively the mobile device 8 may transmit its commands directly to the lamps 6' or an associated lighting controller, and the service access system 16 instructs the lamps 6' or controller as to whether to accept the commands.

FIG. 3 gives a simplified block diagram of a zoning-based positioning system. The horizontal user plane in which positioning information is of interest is logically divided into multiple zones, e.g. in the illustrated example zones i, ii, iii, iv. These zones may be defined, for instance, by tailoring them to a specific application or service, or may be generically defined.

The following describes a configuration in which the location network is configured to determine the location of the mobile device 8 only to a coarse granularity of zones, not coordinates, and to interpret this directly into a decision on which lamps 6' the mobile device 8 is allowed to control without having to compare coordinates of the mobile device to zone boundaries.

To this end, the location server 14 is configured with knowledge of a mapping of anchor nodes to zones. It comprises a location database 20 which maps an identifier of each anchor node 6 to a respective zone or zones to which that node belongs (zones may overlap). At step 100, the localization module 15 receives the signal measurements from the nodes 6 (network centric) or mobile device 8 (device centric). The localization module 15 is configured to then use the measurements of these signals, in conjunction with the location database 20, in order to determine which zone the mobile device apparently belongs to. Belonging to here may mean which zone the mobile device 8 is in, or which zone it is closest to.

To do this, the localization module 15 determines a representative measurement based on the signal measurements for the anchor nodes 6 of each zone. That is, for each zone, it computes a representative measurement based on the signals received at (network centric) or from (device centric) the anchor nodes 6 belonging to that zone. The representative measurement may be a combination of all the signal measurements for the nodes 6 in the respective zone, for instance an average such as the mean, e.g. the average signal strength or time-of-flight; or a combination of a representative selection of the nodes 6 in the respective zone 6, e.g. an average of a selection of the signals having highest signal strength or lowest time of flight. These representative measurements are compared to determine which zone (or zones) the mobile device 8 appears to be in or closest to.

Upon processing the signal measurements using the mapping of anchor nodes to zones, the localization module 15 thus determines that the mobile device 8 belongs to one or more zones with indices contained in a certain set SA. At step 200 this index or indices of the one or more determined zones is signaled to the commissioning map database 19 along with an identifier IDx of the mobile device 8.

The commissioning database 19 is a lighting database having a mapping of lamps 6' to zones, preferably the set of lamps 6' that determine illumination in given zones. The commissioning database 19 thus determines which lamps 6' indexed by set SL correspond to the determined zone(s) indicated to it by the localization module 15. I.e. based on SA the commissioning map 19 determines the set SL of lamp indices to which the user with device IDx may be provided control access. At step 300, the set SL is then indicated from the commissioning database 19 to the lighting service access block 16, and in response at step 400 the lighting access service 16 provides the device IDx with access to control these lamps.

An example mapping for FIG. 3 would be as follows (assuming here one lamp per anchor node 6*a*-6*l*).
Location database 20:

| Anchor nodes | Zone |
|---|---|
| 6a, 6b, 6c, 6d | i |
| 6c, 6d, 6e, 6f | ii |
| 6g, 6h, 6i, 6j | iii |
| 6i, 6j, 6k, 6l | iv |

Commissioning database 19:

| Lamps | Zone |
|---|---|
| 6a, 6b, 6c, 6d | i |
| 6c, 6d, 6e, 6f | ii |
| 6g, 6h, 6i, 6j | iii |
| 6i, 6j, 6k, 6l | iv |

Say for illustration that the localization module 15 on the location server 14 determines that the mobile device belongs to zone ii. At step 200 the localization module 15 transmits the index of zone ii and the identifier IDx of the mobile device 8 from the location server 14 to the commissioning database 19. The commissioning database 19 looks up the lamps {6*b*, 6*c*, 6*d*, 6*e*} mapped to zone ii, and at step 300 transmits the indices of these lamps along with the identifier IDx of the mobile device 8 to the lighting control service on the access server 16. At step 400 the lighting access service 16 grants the mobile device 8 identified by identifier IDx with access to control of the indicated lamps {6*b*, 6*c*, 6*d*, 6*e*} (and those lamps only).

Note that in embodiments, anchor nodes 6 may belong to more than one zone. Note also that in embodiments, when anchor nodes 6 are not collocated with lamps, the set SL is not necessarily the same as the set SA (unlike the example mappings shown above).

In one particular embodiment, each zone is defined by the lamps 6' sharing a respective common lighting controller for that zone. I.e. the set of lamps of one zone share a common lighting controller, and the set of lamps of another zone are those sharing another lighting controller, etc.

Furthermore, there are a number of possible embodiments for processing the signal measurements are to determine which zone (or zones) the mobile device 8 belongs to.

In a first such embodiment, hard detection is used to decide zones. That is, the localization module 15 compares the average signal strengths (e.g. RSSI) for the different zones, and the zone having the highest average signal strength is taken as the zone which the mobile device 8 is determined to belong to. E.g. in the example of FIG. 3, zone ii is selected if it is determined that the mean RSSI of anchor nodes 6*c*-6*e* is higher than the other combinations. Alternatively it would be possible to look for the zone with the lowest time-of-flight.

An alternative is to use soft detection based on log-likelihood ratios. That is, the localization module 15 is configured to perform a soft detection based on a log likelihood ratio of the probability that the mobile device 8 belongs to a candidate one of said zones n relative to the probability that the mobile device does not belong to the candidate zone n. For example, the localization module 15 computes the log likelihood ratio:

$$\log[Pr(\text{zone}=n|\text{RSSI})/Pr(\text{zone}\backslash neq\_n|\text{RSSI})]$$

for each candidate zone n, where Pr (zone=n|RSSI) is the probability that the mobile device 8 is in zone n for a given set of received signal strengths, and Pr(zone\neq_n|RSSI) is the probability that the mobile device 8 is not in zone n given the same set of received signal strengths. Probability distributions of RSSI in different zones may be collected for example using a priori fingerprints and/or crowd sourced data (i.e. a set of previously collected reports of what signal strengths were experienced at various different positions throughout the environment—fingerprinting techniques for localization are in themselves known in the art). Thus, in real-time Pr(RSSI|zone=n) may be obtained. The log likelihood ratio then can be obtained by applying Bayes rule and assuming that a user is equally likely to be in any zone. If however the probability to be in a zone is known or estimated, i.e. the user is in zone n Pr(zone=n) at a particular instant, then this knowledge or estimate can additionally be used without resorting to the assumption that a user can be in any zone with equal probability.

The location module 15 then compares the log likelihood ratios for the different candidate zones n and selects the zone having the highest ratio as the zone which the mobile device is determined to be in. Alternatively a user may be ascribed to more than one zone with coarse positioning, e.g. the user is allowed access to any zone for which his or her device has greater than a certain threshold LLR of belonging to the respective zone. In this latter case, access to lamps can still be reasonably reliable, although the user may get access to more lamps than required.

Another technique which may be used in conjunction with either of the above, is to track IDx to improve accuracy. That is, the localization module 15 may be configured to determine the one or more zones to which the mobile device 8 belongs additionally based on a likelihood of continuity as the mobile device (8) moves between zones over time E.g. if the user was in zone ii at the last determination, then at the next determination he or she is likelier to be in zones i, ii or iii rather than zone iv. For example this may be performed as follows.

Let Sj denote the j-th zone; and RSSI(n, k) denote the RSSI value from anchor node n, at time k. A tracking score may then be constructed as:

$$A(k, j) = c \cdot A(k-1, j) + \frac{1}{|Sj|} \sum_{n \in Sj} RSSI(n, k)$$

At time instant k, the user is then declared in zone j* where:

$$j* = \max_j A(k, j)$$

It will be appreciated that the invention also applies to computer programs, particularly computer programs on or in a carrier, adapted to put the invention into practice. The program may be in the form of a source code, an object code, a code intermediate source and an object code such as in a partially compiled form, or in any other form suitable for use in the implementation of the method according to the invention.

Another embodiment relating to a computer program product comprises computer-executable instructions corresponding to each means of at least one of the systems and/or products set forth herein. These instructions may be subdivided into sub-routines and/or stored in one or more files that may be linked statically or dynamically.

As stipulated herein above the invention may further be embodied in the form of a computer program product. When provided on a carrier, the carrier of a computer program may be any entity or device capable of carrying the program. For example, the carrier may include a storage medium, such as a ROM, for example, a CD ROM or a semiconductor ROM, or a magnetic recording medium, for example, a hard disk. Furthermore, the carrier may be a transmissible carrier such as an electric or optical signal, which may be conveyed via electric or optical cable or by radio or other means. When the program is embodied in such a signal, the carrier may be constituted by such a cable or other device or means. Alternatively, the carrier may be an integrated circuit in which the program is embedded, the integrated circuit being adapted to perform, or used in the performance of, the relevant method.

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A system, comprising:
an input configured to receive measurements for localizing a mobile device, the measurements corresponding to measurements of wireless signals transmitted between the mobile device and a plurality of reference nodes;
a localization database configured to map each of the plurality of reference nodes to one or more of a plurality of zones;
a localization module configured, for each of the plurality of zones in the localization database, to determine a representative value based on a combination of said measurements for the plurality of reference nodes of the respective zone, wherein the localization module is further configured to compare the representative values of the zones with one another to directly determine which one or more of the zones the mobile device belongs to;
a lighting database configured to map between lamps and said plurality of zones, configured to receive an index or indices of each of the one or more determined zones from the localization module, and configured, based on the received index or indices, to directly relate the one or more determined zones to one or more of the lamps by the lighting database, and configured to transmit an index or indices of the directly related one or more lamps to a lighting control; and a lighting access service module comprising the lighting control and configured to grant the mobile device with access to control of the one or more lamps on condition of being related to the one or more determined zones by the lighting database.

2. The system of claim 1, wherein the lighting database is configured to:
   map between sets of lamps and said plurality of zones, and
   directly relate the one or more determined zones to one or more sets of lamps in the lighting database.

3. The system of claim 2, wherein the lighting database comprises a one-to-one mapping between said plurality of zones and said sets of lamps, mapping each zone to a respective set of lamps.

4. The system of claim 2, wherein the lighting database is not restricted to a one-to-one mapping between said plurality of zones and said sets of lamps.

5. The system of claim 1, wherein said representative value is an average of the measurements for the plurality of reference nodes of the respective zone.

6. The system of claim 1, wherein said measurements comprise measurements of received signal strength of said wireless signals.

7. The system of claim 1, wherein said measurements comprises time-of-flight measurements of said wireless signals.

8. The system of claim 1, wherein the localization module is configured to perform a hard detection whereby the mobile device is determined to belong to a zone having highest average signal strength measurement, or lowest average time-of-flight.

9. The system of claim 1, wherein the localization module is configured to perform a soft detection based on a log likelihood ratio of the probability that the mobile device belongs to a selected one of said plurality of n zones and the probability that the mobile device does not belong to the selected n zone, wherein n is an integer greater than zero.

10. The system of claim 1, wherein the localization module is configured to determine said one or more zones additionally based on a likelihood of continuity as the mobile device moves between the plurality of zones over time.

11. The system of claim 1, wherein the wireless signals are transmitted from the mobile device to the plurality of reference nodes.

12. The system of claim 1, wherein the wireless signals are transmitted from the plurality of reference nodes to the mobile device.

13. The system of claim 1, wherein the plurality of reference nodes are anchor nodes of a dedicated indoor positioning network.

14. The system of claim 1, wherein the localization module is implemented on a location server, the location server being configured to transmit the index of each of the one or more determined zones to the lighting database.

15. A method, comprising:
   receiving measurements for localizing a mobile device, the measurements corresponding to measurements of wireless signals transmitted between a mobile device and a plurality of reference nodes;
   referring to a localization database which maps each of the plurality of reference nodes to one or more of a plurality of zones;
   determining, for each of the plurality of zones in the localization database, a representative value based on a combination of said measurements for the plurality of reference nodes of each respective zone;
   comparing the representative values of the plurality of zones with one another to directly determine which one or more of the plurality of zones the mobile device belongs to;
   transmitting an index or indices of each of the one or more determined zones to a lighting database and, based on the received index or indices, directly relating the one or more determined zones to one or more lamps by the lighting database;
   transmitting an index or indices of the directly related one or more lamps to a lighting control; and
   granting the mobile device with access to control of said one or more lamps on condition of being related to the one or more determined zones by the lighting database.

16. A computer program product downloadable from a communication network and/or stored on a non-transitory computer-readable and/or executable medium, wherein it comprises program code instructions for implementing a method according to claim 15.

17. The system of claim 1, wherein the lighting database directly relates the one or more determined zones to one or more of the lamps without requiring exact position information for the one or more of the lamps.

18. The system of claim 1, wherein the lighting database directly relates the one or more determined zones to one or more of the lamps without referring to coordinates of the one or more lamps.

19. The method of claim 15, wherein directly relating the one or more determined zones to the one or more lamps is performed without requiring exact position information for the one or more of the lamps.

20. The method of claim 15, wherein directly relating the one or more determined zones to the one or more lamps is performed without referring to coordinates of the one or more lamps.

* * * * *